(12) United States Patent
Itoh

(10) Patent No.: US 8,677,736 B2
(45) Date of Patent: Mar. 25, 2014

(54) EXHAUST GAS PURIFICATION APPARATUS OF AN INTERNAL COMBUSTION ENGINE

(75) Inventor: Kazuhiro Itoh, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/001,846

(22) PCT Filed: Mar. 5, 2010

(86) PCT No.: PCT/JP2010/053631
§ 371 (c)(1),
(2), (4) Date: Dec. 29, 2010

(87) PCT Pub. No.: WO2011/108110
PCT Pub. Date: Sep. 9, 2011

(65) Prior Publication Data
US 2011/0219754 A1  Sep. 15, 2011

(51) Int. Cl.
| | |
|---|---|
| F01N 3/00 | (2006.01) |
| F01N 3/10 | (2006.01) |
| F01N 3/02 | (2006.01) |
| F01N 1/00 | (2006.01) |

(52) U.S. Cl.
USPC .............. 60/286; 60/276; 60/295; 60/301; 60/311; 60/324

(58) Field of Classification Search
USPC ............ 60/276, 286, 295, 299, 301, 303
See application file for complete search history.

(56) References Cited

U.S. PATENT DOCUMENTS

| | | | |
|---|---|---|---|
| 7,485,272 B2 * | 2/2009 | Driscoll et al. ............. 423/213.2 |
| 2003/0200743 A1 | 10/2003 | Berriman et al. |
| 2005/0013756 A1 | 1/2005 | Amou et al. |
| 2005/0129599 A1 | 6/2005 | Berriman et al. |
| 2006/0117741 A1 * | 6/2006 | Mayer et al. ................. 60/286 |
| 2007/0277505 A1 * | 12/2007 | Dawson et al. .............. 60/281 |
| 2008/0066453 A1 * | 3/2008 | Oberski et al. .............. 60/286 |

(Continued)

FOREIGN PATENT DOCUMENTS

| | | |
|---|---|---|
| JP | A-2001-113134 | 4/2001 |
| JP | A-2004-044499 | 2/2004 |

(Continued)

OTHER PUBLICATIONS

Notice of Reason for Rejection dated Aug. 7, 2012 from Japanese Patent Application No. 2010-550968 (with translation).

(Continued)

*Primary Examiner* — Audrey K Bradley
(74) *Attorney, Agent, or Firm* — Oliff PLC

(57) ABSTRACT

A gas additive and a liquid additive are supplied efficiently. There are provided a liquid supply device that stores a liquid additive and supplies the liquid additive into an exhaust passage of an internal combustion engine, a gas supply device that stores a gas additive and supplies the gas additive into the exhaust passage, a catalyst that is arranged in the exhaust passage at a downstream side of locations at which the additives are supplied from the liquid supply device and the gas supply device, respectively, with the additives reacting in the catalyst, and an adjustment device that adjusts an amount of the liquid additive to be added from the liquid supply device and an amount of the gas additive to be added by the gas supply device in accordance with a rule defined beforehand.

8 Claims, 11 Drawing Sheets

(56) References Cited

U.S. PATENT DOCUMENTS

| | | |
|---|---|---|
| 2008/0223021 A1 | 9/2008 | Shaikh et al. |
| 2010/0005787 A1 | 1/2010 | Hosoya et al. |
| 2011/0232611 A1 | 9/2011 | Shaikh et al. |

FOREIGN PATENT DOCUMENTS

| | | |
|---|---|---|
| JP | A-2005-524012 | 8/2005 |
| JP | A-2008-075543 | 4/2008 |
| JP | A-2008-157188 | 7/2008 |
| JP | B2-4262522 | 5/2009 |
| JP | A-2009-264147 | 11/2009 |
| WO | WO 99/56858 A2 | 11/1999 |
| WO | WO 2004/042207 A1 | 5/2004 |

OTHER PUBLICATIONS

International Search Report issued in Application No. PCT/JP2010/053631; dated May 25, 2010 (with translation).

Nov. 29, 2013 Extended European Search Report issued in European Patent Application No. 10792805.3.

* cited by examiner

EXHAUST GAS PURIFICATION APPARATUS OF AN INTERNAL COMBUSTION ENGINE

TECHNICAL FIELD

The present invention relates to an exhaust gas purification apparatus of an internal combustion engine.

BACKGROUND ART

There has been known a technique in which an ammonia generation part is provided which serves to heat and decompose urea by means of a heater to generate ammonia, so that urea water in the form of liquid and ammonia in the form of gas are supplied (for example, see a first patent document). However, because electric power is consumed so as to heat ammonia by means of the heater, energy is consumed too much. As a result of this, there is a fear that fuel economy or efficiency may get worse. In addition, it takes time to generate ammonia, so there is a possibility that much time may be taken until ammonia is supplied or the amount of ammonia to be supplied may be varied.

PRIOR ART REFERENCES

Patent Documents

First Patent Document: Japanese patent No. 4262522
Second Patent Document: Japanese translation of PCT international application No. 2005-524012

SUMMARY OF THE INVENTION

Problems to be Solved by the Invention

The present invention is made in view of the problems as mentioned above, and has for its object to provide a technique of supplying a gas additive and a liquid additive in an efficient manner.

Means for Solving the Problems

In order to achieve the above-mentioned object, an exhaust gas purification apparatus of an internal combustion engine according to the present invention is provided with
a liquid supply device that stores a liquid additive and supplies the liquid additive into an exhaust passage of the internal combustion engine,
a gas supply device that stores a gas additive and supplies the gas additive into said exhaust passage,
a catalyst that is arranged in the exhaust passage at a downstream side of locations at which the additives are supplied from said liquid supply device and said gas supply device, with the additives reacting in the catalyst, and
an adjustment device that adjusts an amount of the liquid additive to be added from said liquid supply device, and an amount of the gas additive to be added by said gas supply device in accordance with a rule which has been defined beforehand.

The gas supply device or the liquid supply device adds a reducing agent or an oxidizing agent as an additive. Then, this additive reacts in the catalyst arranged at the downstream side thereof. By being supplied with the additive, the catalyst purifies the exhaust gas, or raises the temperature of the exhaust gas, or recovers its purification ability, for example.

Here, the gas additive and the liquid additive are different from each other in their individual features, and respectively have merits and demerits. For example, the gas additive is high in reactivity, but becomes easy to pass through the catalyst depending on the operating state of the internal combustion engine. Also, for example, the liquid additive is difficult to disperse in the exhaust gas, but is easy to be adsorbed to the catalyst.

To cope with this, the adjustment device adjusts the amount of the gas additive, and the amount of the liquid additive in accordance with the rule defined beforehand. This may adjust a supply ratio between liquid and gas. The supply ratio is a ratio of the amount of supply of each additive with respect to the total amount of supply of the additives. In addition, the supply of one of the gas and liquid additives may be stopped. The rule which has been defined beforehand may also be a map which has been stored beforehand. For example, in cases where the supply of the liquid additive is more advantageous than the supply of the gas additive, the liquid additive is supplied, or the proportion of the liquid additive is made higher. On the other hand, in cases where the supply of the gas additive is more advantageous than the supply of the liquid additive, the gas additive is supplied, or the proportion of the gas additive is made higher. Here, note that a decision as to whether priority is given to the gas additive or the liquid additive may be made according to the purification rate of harmful substances in the exhaust gas by each of the additive or the extent to which each of the additives passes through the catalyst. Thus, by adjusting the amount of the gas additive and the amount of the liquid additive in accordance with the rule defined beforehand, it becomes possible to perform the supply of the additives corresponding to the state or condition at that time. Then, by storing the liquid additive and the gas additive separately from each other, the energy required to generate the gas additive becomes unnecessary, so the additives can be supplied to the catalyst in an efficient manner.

In the present invention, there is provided a detection device that detects a physical quantity which has a correlation with an amount of the gas additive passing through said catalyst, and
said adjustment device is able to adjust the amount of the liquid additive to be added from said liquid supply device and the amount of the gas additive to be added by said gas supply device, based on the physical quantity detected by said detection device.

The detection device may detect a physical quantity which has a correlation with an amount of the gas additive reacting in the catalyst. In addition, the detection device may detect a physical quantity which has a correlation with the ratio of the gas additive passing through the catalyst with respect to the gas additive supplied from the gas supply device. Here, the amounts in which the liquid additive and the gas additive pass through the catalyst change respectively with the operating state of the internal combustion engine, etc. When the additives pass through the catalyst, they will go to waste, and the purification rate will fall, so such a thing is not desirable. On the other hand, if the amount of the gas additive to be added is adjusted based on the physical quantity which has a correlation with the amount of the gas additive passing through the catalyst, it will be possible to enhance the purification rate to a further extent.

In the present invention, said adjustment device can make the proportion of the liquid additive to be added from said liquid supply device higher and the proportion of the gas additive to be added by said gas supply device lower, in accordance with regions where the amount of the gas additive passing through said catalyst, represented by said physical quantity, becomes larger.

The adjustment device makes the proportion of the liquid additive higher when it is in a state where the amount of the gas additive passing through the catalyst increases. That is, the liquid additive is made to increase, and the gas additive is made to decrease. Here, note that to make the proportion of the liquid additive higher includes to add only the liquid additive. Also, to make the proportion of the gas additive lower includes not to perform the addition of the gas additive. Here, the liquid additive, a part of which adheres to the catalyst and the exhaust passage, is less prone to pass through the catalyst than the gas additive. Accordingly, by making the proportion of the liquid additive higher, it is possible to suppress the additives from passing through the catalyst. Here, note that as the physical quantity which has a correlation with the amount of the additive passing through the catalyst, there can be used, for example, the number of engine revolutions per minute, the engine load, the temperature of the exhaust gas, or the amount of the exhaust gas. In addition, a physical quantity which represents an acceleration of the internal combustion engine can also be used. Here, note that "the region" may also be an operating region or a temperature region.

In the present invention, said detection device can detect acceleration of the internal combustion engine, and said adjustment device can make the proportion of the liquid additive to be added from said liquid supply device higher and the proportion of the gas additive to be added by said gas supply device lower, at the time of acceleration of the internal combustion engine than at the time of steady operation thereof.

Here, in an operating state in which the flow rate of the exhaust gas increases at the time of transient operation of the internal combustion engine, the gas additive becomes easy to pass through the catalyst. That is, the gas additive becomes easier to pass through the catalyst at the time of acceleration than at the time of steady operation. To cope with this, if the proportion of the liquid additive is made higher at the time of acceleration, it will be possible to suppress the additives from passing through the catalyst. Here, note that the larger the degree of the acceleration, the easier the gas additive becomes to pass through the catalyst, and hence the proportion of the liquid additive may be made to increase. In addition, when the rate of increase of the amount of intake air or the amount of the exhaust gas is equal to or more than a threshold value, a determination may be made that the engine is accelerating. This threshold value may be changed according to other physical quantities. Moreover, a determination of acceleration may be made according to the rate of change of the load.

In addition, in the present invention, the amount of additive to be supplied per one time when supplying the additive can be made larger, and the interval at which the additive is supplied can be made longer, at the time of acceleration of said internal combustion engine than at the time of steady operation thereof.

By doing in such a manner, the amount of the additive being adsorbed to the catalyst can be made larger, so it is possible to suppress the additive from passing through the catalyst to a further extent.

Here, note that in the present invention, said adjustment device makes the proportion of the liquid additive to be added from said liquid supply device higher and the proportion of the gas additive to be added by said gas supply device lower, in accordance with the increasing number of engine revolutions per minute.

Here, the higher the number of engine revolutions per minute, the more the amount of the exhaust gas increases, for example, so the easier the gas additive becomes to pass through the catalyst. To cope with this, if the proportion of the liquid additive is made higher in accordance with the increasing number of engine revolutions per minute, it will be possible to suppress the additives from passing through the catalyst. Here, note that in cases where the number of engine revolutions per minute is equal to or higher than a threshold value, only the liquid additive may be supplied, and in cases where the number of engine revolutions per minute is less than the threshold value, only the gas additive may be supplied. This threshold value may be changed according to other physical quantities.

Moreover, in the present invention, said adjustment device can make the proportion of the liquid additive to be added from said liquid supply device higher and the proportion of the gas additive to be added by said gas supply device lower, in accordance with the increasing engine load.

Here, the higher the engine load, the higher the temperature of the exhaust gas, and the more the pressure of the exhaust gas increases, for example, so the easier the gas additive becomes to pass through the catalyst. To cope with this, if the proportion of the liquid additive is made higher in accordance with the increasing engine load, it will be possible to suppress the additives from passing through the catalyst. Here, note that in cases where the engine load is equal to or higher than a threshold value, only the liquid additive may be supplied, and in cases where the engine load is less than the threshold value, only the gas additive may be supplied. This threshold value may be changed according to other physical quantities.

Further, in the present invention, said adjustment device can make the proportion of the liquid additive to be added from said liquid supply device higher and the proportion of the gas additive to be added by said gas supply device lower, in accordance with the higher temperature of the exhaust gas.

Here, when the temperature of the exhaust gas is relatively high, the liquid additive is less prone to pass through the catalyst than the gas additive. On the other hand, when the temperature of the exhaust gas is relatively low, the gas additive is less prone to pass through the catalyst than the liquid additive. Accordingly, if the proportion of the liquid additive is made higher in accordance with the higher temperature of the exhaust gas, it will be possible to suppress the additives from passing through the catalyst. Here, note that in cases where the temperature of the exhaust gas is equal to or higher than a threshold value, only the liquid additive may be supplied, and in cases where the temperature of the exhaust gas is less than the threshold value, only the gas additive may be supplied. This threshold value may be changed according to other physical quantities.

In the present invention, said adjustment device can make the proportion of the mount of the liquid additive to be added from said liquid supply device higher and the proportion of the gas additive to be added by said gas supply device lower, in accordance with the increasing amount of the exhaust gas.

Here, the more the amount of the exhaust gas, the easier the gas additive becomes to pass through the catalyst. To cope with this, if the proportion of the liquid additive is made higher in accordance with the increasing amount of the exhaust gas, it will be possible to suppress the additives from passing through the catalyst. Here, note that in cases where the amount of the exhaust gas is equal to or higher than a threshold value, only the liquid additive may be supplied, and in cases where the amount of the exhaust gas is less than the threshold value, only the gas additive may be supplied. This threshold value may be changed according to other physical quantities. In addition, because the amount of the exhaust gas has a correlation with the amount of intake air, the amount of intake air can be used in place of the amount of the exhaust gas.

In the present invention, said catalyst can be arranged at an upstream side of, or is supported by, a filter which collects particulate matter in the exhaust gas, and said adjustment device can make the proportion of the liquid additive to be added from said liquid supply device lower and the proportion of the gas additive to be added by said gas supply device higher, when regeneration of said filter is carried out than when regeneration of said filter is not carried out.

The regeneration of the filter is carried out by adding the additives to the catalyst to generate heat. The particulate matter (PM) is oxidized by this heat and oxygen in the exhaust gas, as a result of which the particulate matter is removed. At this time, if the liquid additive is added, there will be a fear that the liquid additive may be solidified by adhering to the catalyst, the wall surface of the exhaust passage, etc. To cope with this, if the proportion of the gas additive is made higher, it will be possible to suppress the additives from being solidified. Here, note that at the time of regeneration of the filter, only the gas additive may be added.

In addition, in the present invention, said adjustment device can make the proportion of the liquid additive to be added from said liquid supply device lower and the proportion of the gas additive to be added by said gas supply device higher when the additives are added so as to raise the temperature of said catalyst to a temperature at which the additives adsorbed to said catalyst are removed than when the temperature of said catalyst is not raised to the temperature at which the additives adsorbed to said catalyst are removed.

For example, when the additives adsorbed to the catalyst have solidified, there is a case that the additives may be able to be removed by raising the temperature of the catalyst. At this time, if the liquid additive is supplied, there will be a fear that the liquid additive may be solidified by adhering to the catalyst, the wall surface of the exhaust passage, etc. However, at this time, if the proportion of the gas additive is made higher, it will be possible to suppress the additives from being solidified. Here, note that at this time, only the gas additive may be supplied.

In the present invention, said gas supply device can be constructed to comprise a gas injection valve that injects the gas additive into the exhaust gas, and said liquid supply device can be constructed to comprise a liquid injection valve that injects the liquid additive into the exhaust gas, and said gas injection valve and said liquid injection valve can be arranged in opposition to each other.

If doing in this manner, at the time when the liquid additive and the gas additive are supplied at the same time, the liquid additive and the gas additive collide with each other. As a result of this, the additives disperse in a wider area or range in the exhaust gas, so the additives can be supplied to the catalyst in a uniform manner. By doing so, it is possible to supply the additives to the catalyst in an efficient manner.

In the present invention, a plate for causing the additives to collide with each other can be arranged between said gas injection valve and said liquid injection valve. By means of this plate, disturbance or turbulence of the exhaust gas is made greater, so the additives can be dispersed in a more uniform manner.

In the present invention, an ammonia gas can be injected from said gas injection valve, and HC can be injected from said liquid injection valve. By doing so, highly reactive amine type compounds are generated. As a result of this, the purification rate in the catalyst can be enhanced, so it is possible to supply the additives in an efficient manner.

Effect of the Invention

According to the present invention, the gas additive and the liquid additive can be supplied in an efficient manner.

BEST MODES FOR CARRYING OUT THE INVENTION

Hereinafter, reference will be made to specific embodiments of an exhaust gas purification apparatus of an internal combustion engine according to the present invention based on the attached drawings. Here, note that the following embodiments can be combined as long as feasible.

First Embodiment

Figure 1:
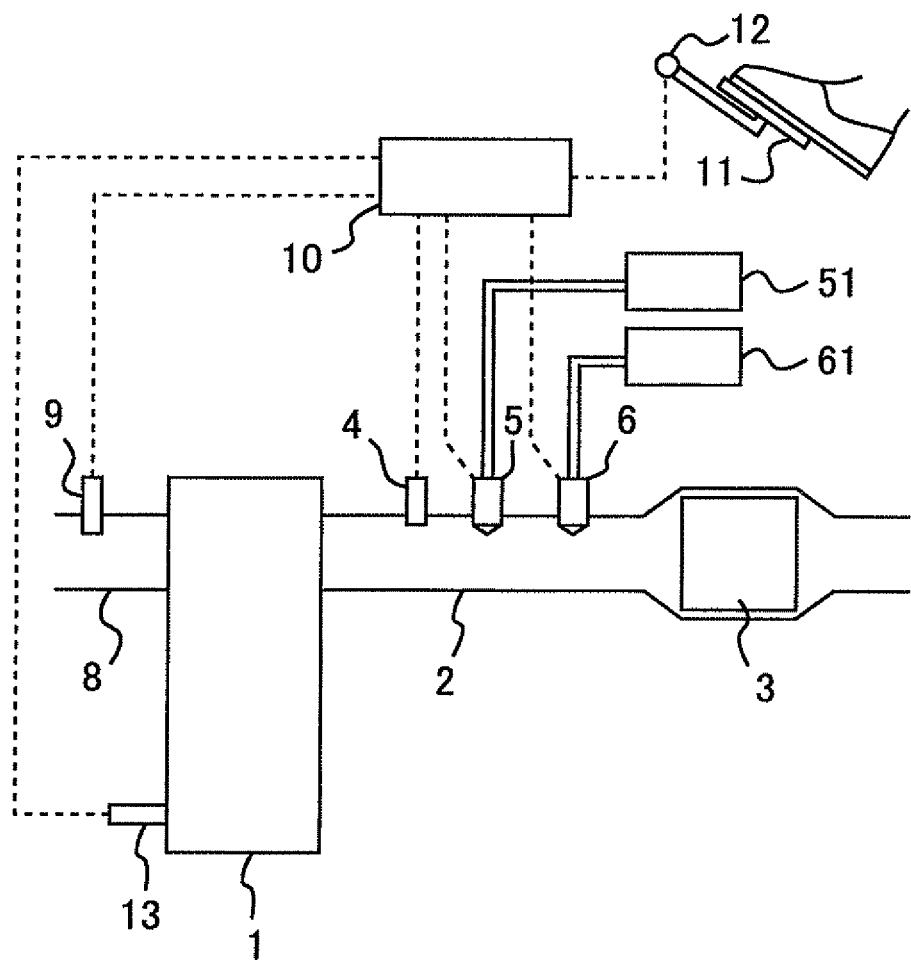
FIG. 1 is a view showing the schematic construction of an exhaust gas purification apparatus of an internal combustion engine according to a first embodiment of the present invention.

FIG. 1 is a view showing the schematic construction of an exhaust gas purification apparatus of an internal combustion engine according to this first embodiment of the present invention. An internal combustion engine 1 shown in FIG. 1 is a four-cycle diesel engine of a water cooled type having four cylinders. Here, note that the following embodiments can be applied even to a gasoline engine in a similar manner.

An exhaust passage 2 is connected to the internal combustion engine 1. In the exhaust passage 2, there are arranged a sensor 4, a liquid injection valve 5, a gas injection valve 6, and a catalyst 3 sequentially from an upstream side in the direction of flow of an exhaust gas. Here, note that, the liquid injection valve 5 may be arranged at the downstream side of the gas injection valve 6, or the liquid injection valve 5 and the gas injection valve 6 may be arranged in the same position.

In addition, the sensor 4 is to detect the state of the exhaust gas, and it detects, for example, the concentration of a specific component in the exhaust gas. As the sensor 4, there can be mentioned, for example, an air fuel ratio sensor, an oxygen concentration sensor, an HC sensor, or a NOx sensor. In addition, for example, it can be a temperature sensor which detects the temperature of the exhaust gas.

The liquid injection valve 5 injects an additive such as a liquid reducing agent, a liquid oxidizing agent or the like. In addition, the gas injection valve 6 injects an additive such as a gas reducing agent, a gas oxidizing agent, or the like. The additives injected from the liquid injection valve 5 and the gas injection valve 6 may be the same kind of thing, or may be different kinds of things. As the additives, there can be used, for example, compounds originating from ammonia. As the compounds originating from ammonia, there can be mentioned urea water, urea, ammonia, bullet, cyanuric acid, isocyanic acid, or amine compounds. In addition, fuel (HC) can also be used for the additives. What is used for the additives is decided according to the kind of catalyst 3. Then, the additives react in the catalyst 3.

Figure 14:
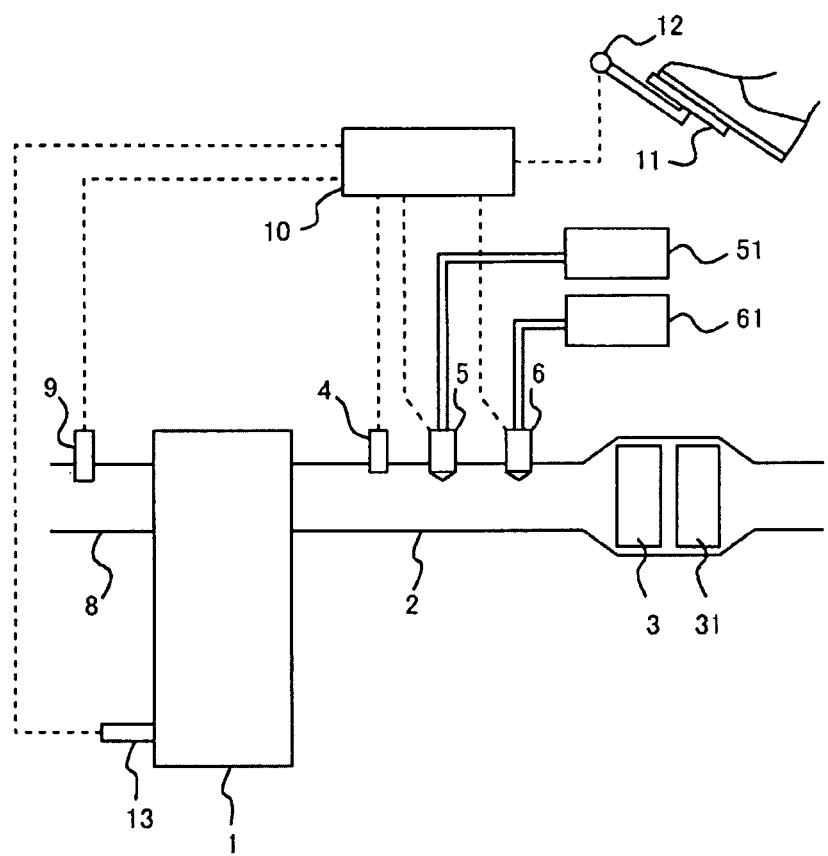
FIG. 14 is a view showing the schematic construction of an alternative exhaust gas purification apparatus of an internal combustion engine according to a first embodiment of the present invention.

As the catalyst 3, there can be mentioned, for example, an occlusion reduction type NOx catalyst, a selective reduction type NOx catalyst, an oxidation catalyst, or a three-way catalyst. In addition, a particulate filter may be provided which supports these catalysts or is arranged at a location upstream thereof, for collecting PM. Alternatively, as illustrated by FIG. 14, the catalyst 3 is arranged at an upstream side of a filter 31 which collects particulate matter in the exhaust gas.

A liquid tank 51, which serves to store a liquid additive, is connected to the liquid injection valve 5. A pump for delivering the liquid additive is built in the liquid tank 51, and this pump supplies the liquid additive toward the liquid injection valve 5. Here, note that the liquid additive may be accumulated or stored in a supply passage for the liquid additive. In addition, a gas tank 61 in which a gas additive is accumulated or stored is connected to the gas injection valve 6. Here, note that the gas tank 61 may accumulate the gas additive in a state in which the additive has been occluded in the catalyst, etc. Also, the gas additive may be accumulated in a supply passage for the gas additive. A pump for delivering the gas additive is built in the gas tank 61, and this pump supplies the gas additive toward the gas injection valve 6. Here, note that in this embodiment, the liquid injection valve 5 and the liquid tank 51 correspond to a liquid supply device in the present invention. Also, in this embodiment, the gas injection valve 6 and the gas tank 61 corresponds to a gas supply device in the present invention.

In addition, an intake passage 8 is connected to the internal combustion engine 1. In the middle of the intake passage 8, there is arranged an air flow meter 9 that outputs a signal corresponding to the amount of intake air flowing through the intake passage 8. By means of this air flow meter 9, the amount of intake air sucked into the internal combustion engine 1 is metered or measured.

In the internal combustion engine 1 constructed as stated above, there is arranged in combination therewith an ECU 10 which is an electronic control unit for controlling the internal combustion engine 1. This ECU 10 controls the operating state of the internal combustion engine 1 in accordance with the operating conditions of the internal combustion engine 1 and/or driver's requirements.

The above-mentioned sensors, an accelerator opening sensor 12, which is able to detect an engine load by outputting an electrical signal corresponding to an amount by which a driver depressed an accelerator pedal 11, and a crank position sensor 13, which detects the number of revolutions per minute of the engine, are connected to the ECU 10 through electrical wiring, and the output signals of these variety of kinds of sensors are inputted to the ECU 10. On the other hand, the liquid injection valve 5 and the gas injection valve 6 are connected to the ECU 10 through electrical wiring, so that the fuel injection valve 5 and the gas injection valve 6 are controlled by the ECU 10. Then, in this embodiment, the sensor 4, the air flow meter 9, the accelerator opening sensor 12, or the crank position sensor 13 corresponds to a detection device in the present invention.

Here, note that in this embodiment, description will be made on the following assumptions. The sensor 4 is a NOx sensor; the liquid injection valve 5 adds urea water; the gas injection valve 6 adds an ammonia gas; and the catalyst 3 is a selective reduction type NOx catalyst. According to such assumptions, the urea water added from the liquid injection valve 5 is hydrolyzed by the heat of the exhaust gas, as a result of which ammonia ($NH_3$) is produced, and a part or all thereof is supplied to the catalyst 3. This ammonia serves to reduce NOx in a selective manner. Then, by supplying the ammonia to the catalyst 3 or by making it to be adsorbed thereto beforehand, NOx is made to be reduced during the time when the NOx passes through the catalyst 3.

In order to make ammonia to be adsorbed to the catalyst 3 beforehand, an additive is added in an intermittent manner. For example, the concentration of NOx is detected by the sensor 4, and the amount of NOx is calculated from the NOx concentration thus detected and the amount of intake air. The amount of ammonia adsorbed to the catalyst 3 decreases according to this amount of NOx, so an additive is supplied at the time when the amount of ammonia adsorbed to the catalyst 3 becomes equal to or less than a prescribed amount. Here, note that the interval at which the additive is supplied may be set to a constant value, and the amount of the additive to be supplied may be decided according to the NOx concentration obtained by the sensor 4.

Incidentally, there is a feature that at the time when the temperature of the exhaust gas is low or in a region where the space velocity (SV) of the exhaust gas is low, the liquid additive (urea water) is lower in the purification rate or in the reaction rate, as compared with the gas additive (ammonia gas), because the hydrolysis takes time or the liquid additive adheres to the catalyst 3 or the wall surface of the exhaust passage 2.

Figure 2:
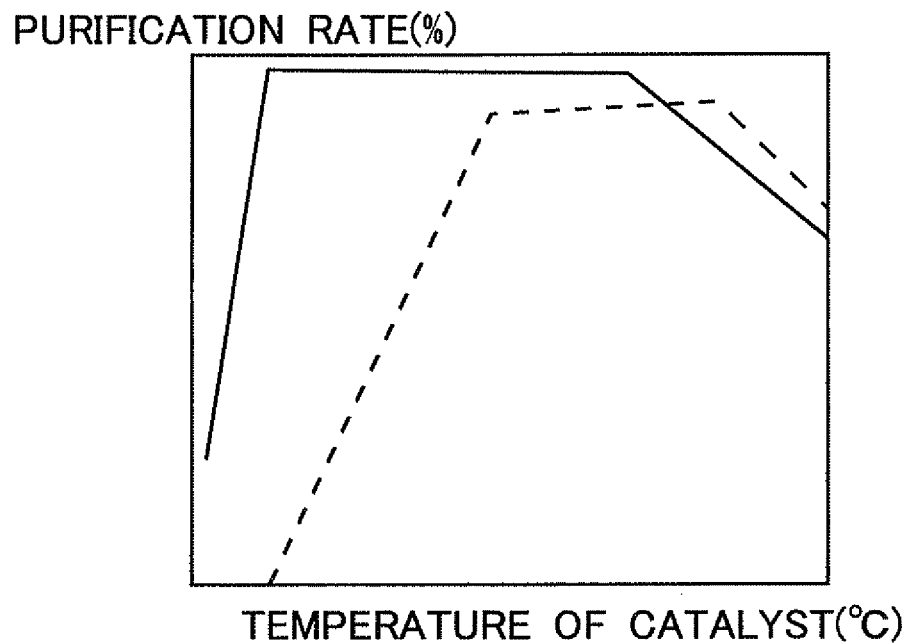
FIG. 2 is a view showing the relation between the temperature of a catalyst and the purification rate of an exhaust gas.

Here, FIG. 2 is a view showing the relation between the temperature of the catalyst 3 and the purification rate of the exhaust gas. The purification rate indicates the ratio of the amount of NOx which is purified in the catalyst 3 to the amount of NOx which flows into the catalyst 3. In FIG. 2, a solid line represents the case of the gas additive, and a broken line represents the case of the liquid additive.

As shown in FIG. 2, the gas additive shows that the purification rate is high from the time when the temperature of the catalyst 3 is low, but in contrast to this, the liquid additive shows that the purification rate does not become high unless the temperature of the catalyst 3 is high to some extent. That is, in cases where the temperature of the catalyst 3 is low, even if urea water is supplied, the conversion ratio thereof into ammonia is low, so the purification rate becomes low. For this reason, when the temperature of the catalyst 3 is low, the purification rate becomes higher in the case of supplying the gas additive than in the case of supplying the liquid additive. On the other hand, when the temperature of the catalyst 3 is high, the purification rate becomes higher in the case of supplying the liquid additive than in the case of supplying the gas additive.

Figure 3:
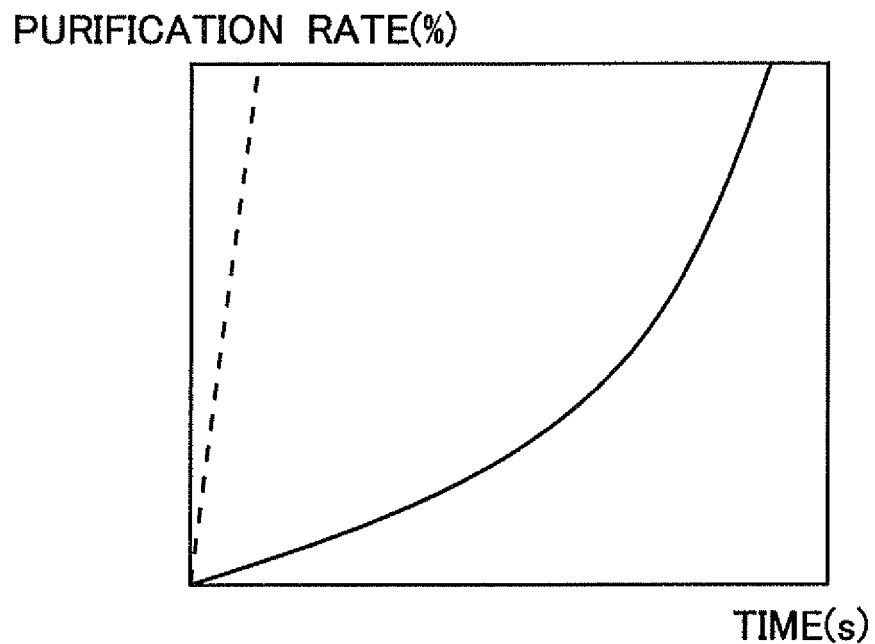
FIG. 3 is a time chart showing the change over time of the purification rate.

In addition, FIG. 3 is a time chart showing the change over time of the purification rate. A solid line represents the case where the SV is relatively low, and a broken line represents the case where the SV is relatively high. As will be understood when looking at FIG. 3, more time is taken for the purification rate to become high in the case of the high SV than in the case of the low SV.

Incidentally, there is a feature that the gas additive (ammonia gas) is lower in the purification rate, as compared with the liquid additive (urea water) at the time of transient operation of the internal combustion engine 1. This is because the gas additive becomes easy to pass through the catalyst 3 in a state where the amount of the exhaust gas passing through the catalyst 3 increases.

Figure 4:
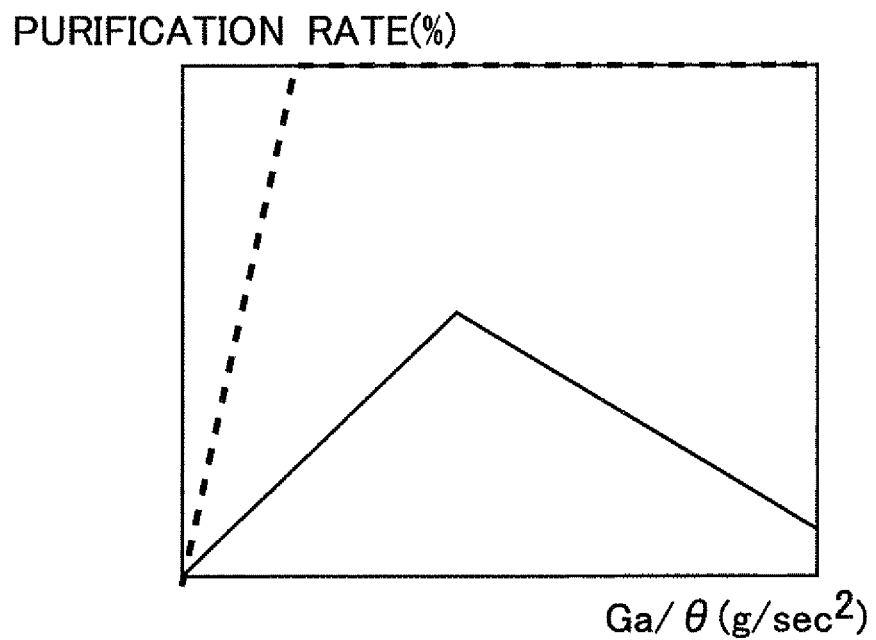
FIG. 4 is a view showing the relation of the rate of change of the amount of intake air and the purification rate at the time of transient operation of the internal combustion engine.

Here, FIG. 4 is a view showing the relation of the rate of change of the amount of intake air and the purification rate at the time of transient operation of the internal combustion engine 1. A solid line represents the case of the gas additive, and a broken line represents the case of the liquid additive. The amount of intake air is an amount of air sucked into the internal combustion engine 1 per unit time. Then, the rate of change (Ga/θ) of the amount of intake air is an amount of change per unit time of the amount of intake air. Here, note that the amount of intake air has a correlation with the amount of the exhaust gas, and hence, the amount of intake air is used in place of the amount of the exhaust gas passing through the catalyst 3. The larger the rate of change of the amount of intake air, the larger the degree of acceleration becomes.

As shown in FIG. 4, the liquid additive can maintain a high purification rate even if the rate of change of the amount of intake air becomes high. On the other hand, the gas additive once becomes higher in the purification rate as in accordance with the higher rate of change of the amount of intake air. However, the purification rate by the gas additive begins to fall when the rate of change of the amount of intake air exceeds a certain value. At this time, the higher the rate of change of the amount of intake air, the easier the gas additive becomes to pass through the catalyst 3. In addition, when the gas additive is supplied in a state where the amount of intake air increases, the volume of the additive being supplied becomes too large, so it becomes difficult to supply the additive.

Thus, the liquid additive and the gas additive have merits and demerits, so in this embodiment, the supply of these additives is carried out by taking these merits and demerits into consideration. For this reason, in this embodiment, the additives can be added from the liquid injection valve 5 and the gas injection valve 6, respectively, in a simultaneous manner or in a time shifted manner. In addition, an additive can also be added only from either one of the injection valves. Further, the amount of the liquid additive and the amount of the gas additive are adjusted according to the operating state of the internal combustion engine 1. This may be to adjust the ratio between the liquid additive and the gas additive according to the operating state of the internal combustion engine 1. Moreover, these may be adjusted according to the state of the catalyst 3.

For example, when the amounts (or the ratio) of the liquid additive passing through the catalyst 3 and the amount of the gas additive passing through the catalyst 3 are different from each other, one of these additives, which is smaller in the amount thereof passing through the catalyst 3 than the other, is supplied. As a result of this, it is possible to suppress the additives from passing through the catalyst 3, so the amounts of consumption of the additives can be reduced. Also, the purification rate of NOx can be increased. In addition, for example, when the purification rates are different between the liquid additive and the gas additive depending upon the operating state of the internal combustion engine 1, the proportion of one of these additives, for which the purification rate is higher than that for the other, may be made higher. As the operating state of the internal combustion engine 1, there can be used, for example, the number of engine revolutions per minute and the engine load.

Figure 5:
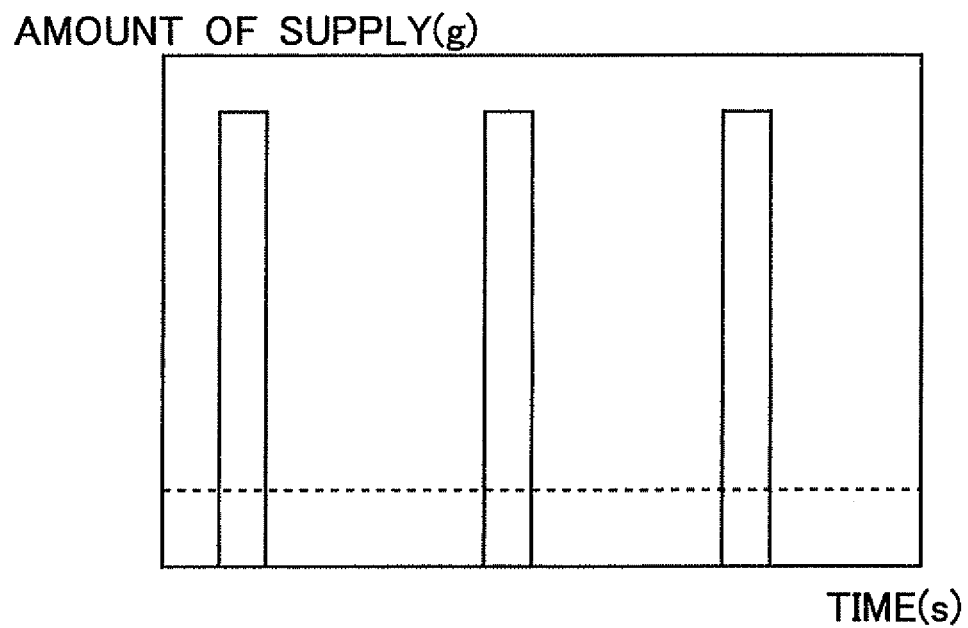
FIG. 5 is a time chart showing the change over time of the amounts of additives to be supplied.

In addition, in this embodiment, at the time of transient operation of the engine, such as at the time of acceleration, the proportion of the supply of the liquid additive is made higher, and the proportion of the supply of the gas additive is made lower. Here, note that at the time of the transient operation, only the liquid additive may be supplied. Also, in cases where the rate of change of the amount of intake air is equal to or more than a threshold value, only the liquid additive may be supplied. This threshold value may be, for example, a boundary of whether the NOx purification rate at the time when the gas additive is supplied becomes a permissible value. Moreover, in place of the rate of change of the amount of intake air, there can also be used an accelerator opening and a duration time thereof, an increment in the amount of fuel supplied to each combustion chamber of the internal combustion engine 1, or an amount of increase of requested torque. Thus, in the operating state of the engine in which the gas additive is apt to pass through the catalyst 3, the proportion of the liquid additive is made higher, or only the liquid additive is supplied. Here, note that the larger the degree of acceleration, the higher the proportion of the supply of the liquid additive may be made, Here, note that as shown in FIG. 5, the amounts of additives to be supplied per unit time may be adjusted at the time of steady operation and at the time of transient operation. Here, FIG. 5 is a time chart showing the change over time of the amounts of additives to be supplied. A solid line represents the case where only the liquid additive is supplied at the time of transient operation, and a broken line represents the case where the liquid additive and the gas additive are supplied at the time of steady operation.

At the time of steady operation, the amount of additive to be supplied at one time when supplying the additive is made small, and the interval of supply is made short. In this case, a fixed amount of additive may always be supplied. On the other hand, at the time of transient operation, the amount of additive to be supplied per one time when supplying the additive is made large, and the interval of supply is made long. This may be such that the amount of additive to be supplied per unit time when supplying the additive is made large, and the interval of supply may be made long. Here, note that the amount of additive to be supplied per unit time may be made large by increasing the injection pressure of the liquid additive. Thus, when the amount of additive to be supplied at one time when supplying the additive is made large, or when the amount of additive to be supplied per unit time is made large, the liquid additive becomes difficult to evaporate, so the amount of the additive to be adsorbed to the catalyst 3 increases. As a result of this, it is possible to suppress the additive from passing through the catalyst 3, thus making it possible to suppress the purification rate of NOx from being decreased.

Figure 6:
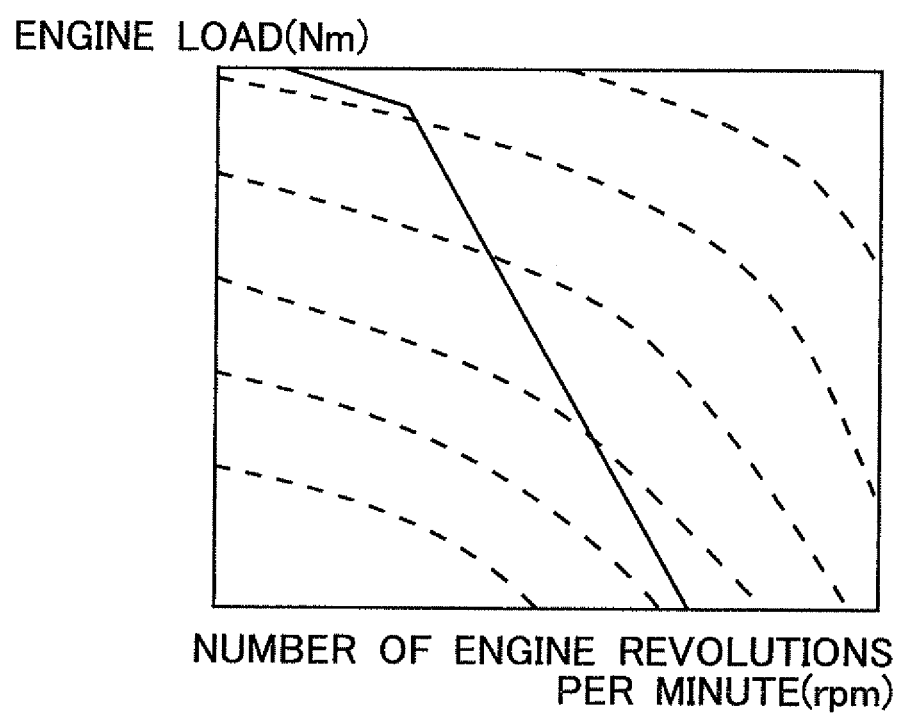
FIG. 6 is a view showing the relation among the number of engine revolutions per minute, the engine load, and the supply mode of the additives.

Moreover, at the time of the steady operation of the internal combustion engine 1, the supply mode of the additives is decided, for example, according to the operating state of the internal combustion engine 1. FIG. 6 is a view showing the relation among the number of engine revolutions per minute, the engine load, and the supply mode of the additives. As the engine load, there may also be used the accelerator opening, a mean effective pressure, a shaft torque, or an amount of fuel injected to each combustion chamber of the internal combustion engine 1. A solid line indicates a boundary between a region in which the gas additive is supplied, and a region in which the liquid additive is supplied. In addition, each of broken lines indicates a range in which the amount of exhaust gas (this may also be the pressure of exhaust gas) is equal or constant. The amount of the exhaust gas increases in accordance with the increasing number of engine revolutions per minute or the increasing engine load. In addition, the gas additive is supplied at a side in which the number of engine revolutions per minute is lower than that on the solid line. Whereas, the liquid additive is supplied at a side in which the number of engine revolutions per minute is higher than that on the solid line. Here, note that an optimum value for the boundary between the liquid and th gas, as shown in FIG. 6, may be obtained through experiments, etc. This boundary may be decided, for example, in such a manner that the NOx purification rate at the time when the liquid additive is supplied is equal to or larger than the permissible value.

In this manner, when the number of engine revolutions per minute is high, only the liquid additive is supplied without depending upon the engine load. Also, when the number of engine revolutions per minute is low, only the gas additive is supplied without depending upon the engine load. In addition, when the number of engine revolutions per minute is about medium, it is decided according to the engine load whether the liquid additive is supplied or the gas additive is supplied. Then, when the number of engine revolutions per minute is about medium, the liquid additive is supplied in cases where the engine load is high, whereas the gas additive is supplied in cases where the engine load is low.

In addition, based on the amount of the exhaust gas shown in FIG. 6, it can also be decided whether either the liquid additive or the gas additive is supplied. That is, when the amount of the exhaust gas is relatively large, the liquid additive becomes higher in the purification rate than the gas additive, so only the liquid additive is supplied. Also, when the amount of the exhaust gas is relatively small, the liquid additive becomes low in the purification rate, so only the gas additive is supplied. Then, when the amount of the exhaust gas is about medium, it is decided according to the number of engine revolutions per minute or the engine load whether the gas additive is supplied or the liquid additive is supplied.

Figure 7:
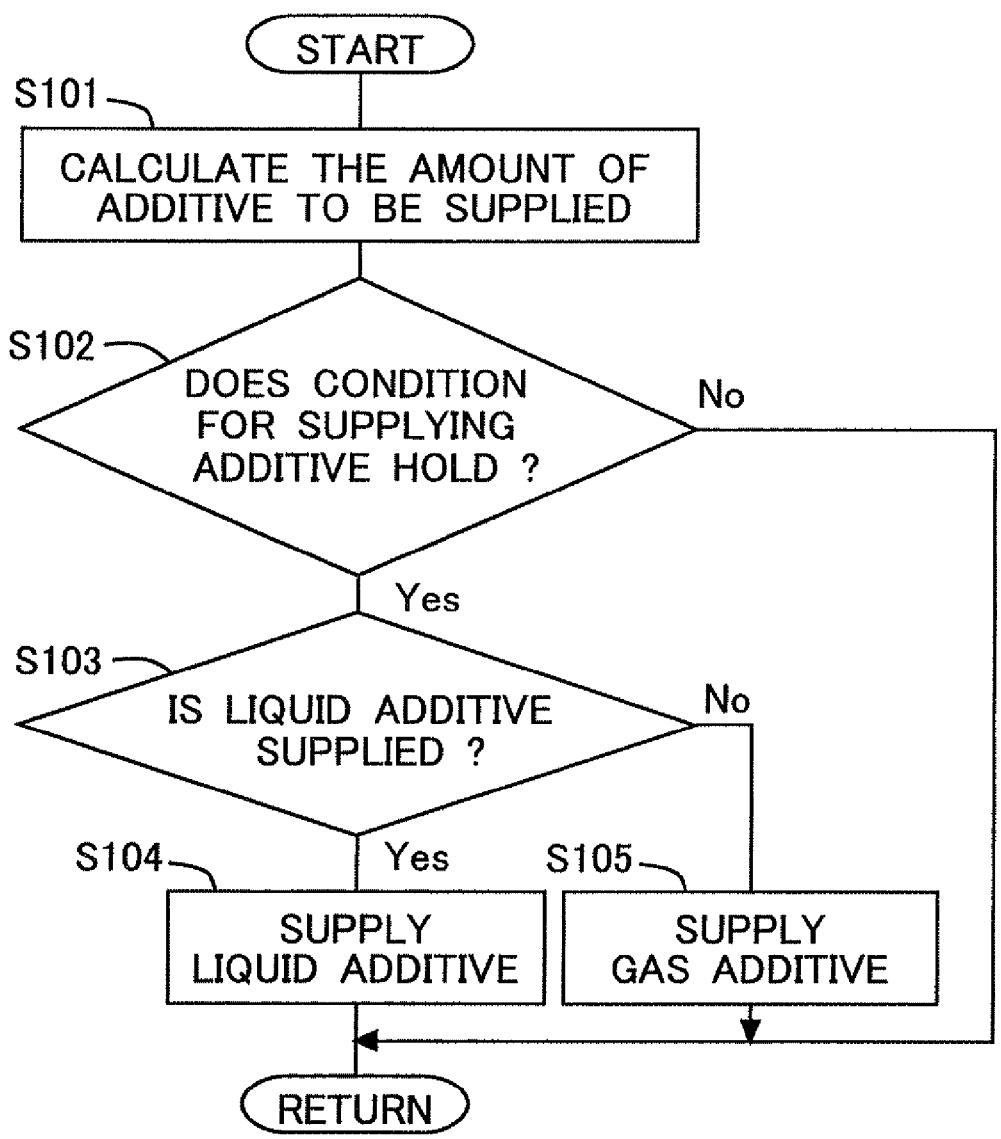
FIG. 7 is a flow chart showing a control flow according to the first embodiment.

FIG. 7 is a flow chart showing a control flow according to this embodiment. This routine is carried out by means of the ECU 10 at each predetermined time interval.

In step S101, the amount of additive to be supplied is calculated. For example, the concentration of NOx is detected by the sensor 4, and the amount of NOx in the exhaust gas is calculated from the NOx concentration thus detected and the amount of intake air. The amount of ammonia adsorbed to the catalyst 3 decreases according to this amount of NOx, so an additive is supplied in an amount to supplement this amount of decrease. Here, note that the amount of additive to be supplied may be set to a prescribed amount, and the interval of supply thereof may instead be adjusted.

In step S102, it is determined whether a condition for supplying an additive holds. For example, if the temperature of the catalyst 3 has not reached an activation temperature, NOx can not be purified, so it is determined that the condition for supplying an additive does not hold. Also, for example, when the amount of ammonia adsorbed to the catalyst 3 becomes equal to or less than a prescribed amount, it is determined that the condition for supplying an additive holds. In cases where an affirmative determination is made in step S102, the routine advances to step S103, whereas in cases where a negative determination is made, no additive can be supplied, and hence this routine is terminated.

In step S103, it is determined whether only the liquid additive is supplied. At the time of acceleration of the internal combustion engine 1, it is determined that only the liquid additive is supplied. On the other hand, at the time of steady operation of the internal combustion engine 1, the number of engine revolutions per minute and the engine load are measured, and a determination is made by substituting these measured values in a map which is shown in FIG. 6. The map shown in FIG. 6 is calculated beforehand through experiments, etc., and is stored in the ECU 10.

In cases where an affirmative determination is made in step S103, the routine advances to step S104, in which the liquid additive is supplied from the liquid injection valve 5. On the other hand, in cases where a negative determination is made in step S103, the routine advances to step S105, in which the gas additive is supplied from the gas injection valve 6. Here, note that in this embodiment, the ECU 10, which carries out the processing of step S103, corresponds to an adjusting device in the present invention.

Here, note that in FIG. 6, the boundary is provided such that either one of the liquid additive and the gas additive is supplied, but in place of this, a region may be provided in which both of the liquid additive and the gas additive are supplied, and in this region, the higher the number of engine revolutions per minute or the engine load, the higher the proportion of the amount of the liquid additive to be supplied may be made, and the lower the proportion of the amount of the gas additive to be supplied may be made.

Here, note that in cases where the temperature of the exhaust gas is equal to or higher than a threshold value, the liquid additive may be supplied, and in cases where the temperature of the exhaust gas is less than the threshold value, the gas additive may be supplied. This threshold value is set, for example, to such a temperature at which the NOx purification rate at the time when the liquid additive is supplied is equal to or larger than the permissible value.

Figure 8:
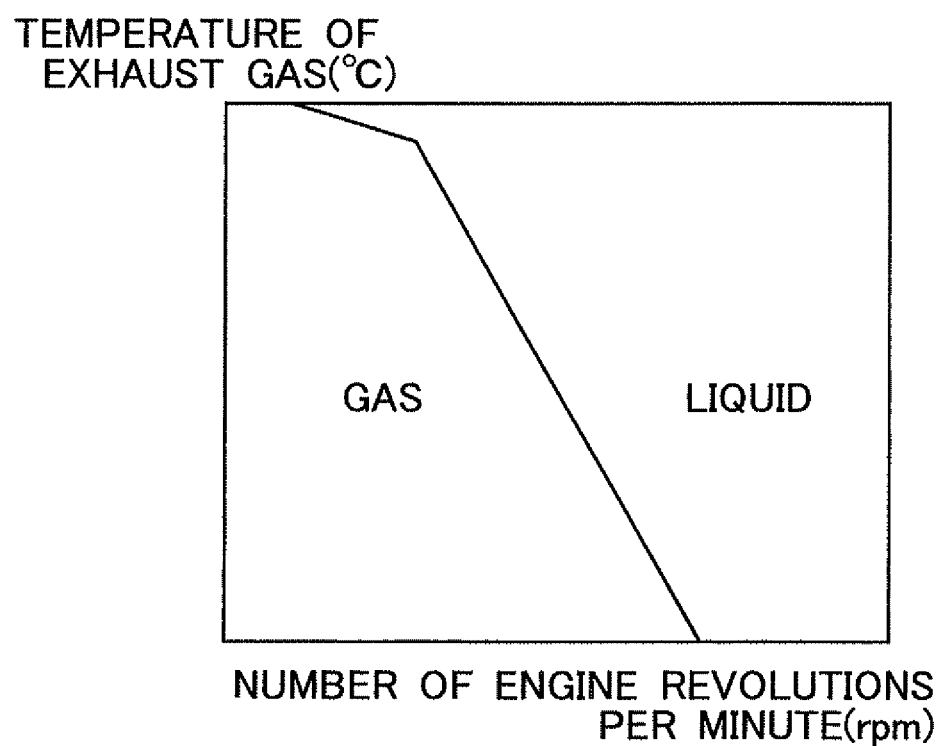
FIG. 8 is a view showing the relation among the number of engine revolutions per minute, the temperature of the exhaust gas, and the supply mode of the additives.

In addition, the ratio between the liquid additive to be supplied and the gas additive to be supplied may be decided according to the temperature of the exhaust gas. FIG. 8 is a view showing the relation among the number of engine revolutions per minute, the temperature of the exhaust gas, and the supply mode of the additives. FIG. 8 shows the case of steady operation of the engine. A solid line indicates a boundary between the region in which the gas additive is supplied, and the region in which the liquid additive is supplied. The gas additive is supplied at a side in which the number of engine revolutions per minute is lower than that on the solid line. Whereas, the liquid additive is supplied at a side in which the number of engine revolutions per minute is higher than that on the solid line. Here, note that an optimum value for the boundary between the liquid and the gas, as shown in FIG. 8, may be obtained through experiments, etc. This boundary may be decided, for example, in such a manner that the NOx purification rate at the time when the liquid additive is supplied is equal to or larger than the permissible value.

That is, when the number of engine revolutions per minute is high, only the liquid additive is supplied without depending upon the temperature of the exhaust gas. Also, when the number of engine revolutions per minute is low, only the gas additive is supplied without depending upon the temperature of the exhaust gas. In addition, when the number of engine revolutions per minute is about medium, it is decided according to the temperature of the exhaust gas whether the liquid additive is supplied or the gas additive is supplied. Then, when the number of engine revolutions per minute is about medium, the liquid additive is supplied in cases where the temperature of the exhaust gas is high, whereas the gas additive is supplied in cases where the temperature of the exhaust gas is low.

Here, note that in FIG. 8, the boundary is provided such that either one of the liquid additive and the gas additive is supplied, but in place of this, a region may be provided in which both of the liquid additive and the gas additive are supplied, and in this region, the higher the number of engine revolutions per minute or the temperature of the exhaust gas, the higher the proportion of the amount of the liquid additive to be supplied may be made. The temperature of the exhaust gas may be measured by the sensor 4, or may be estimated from the operating state of the internal combustion engine 1. In addition, the temperature of the catalyst 3 may be used in place of the temperature of the exhaust gas.

Figure 9:
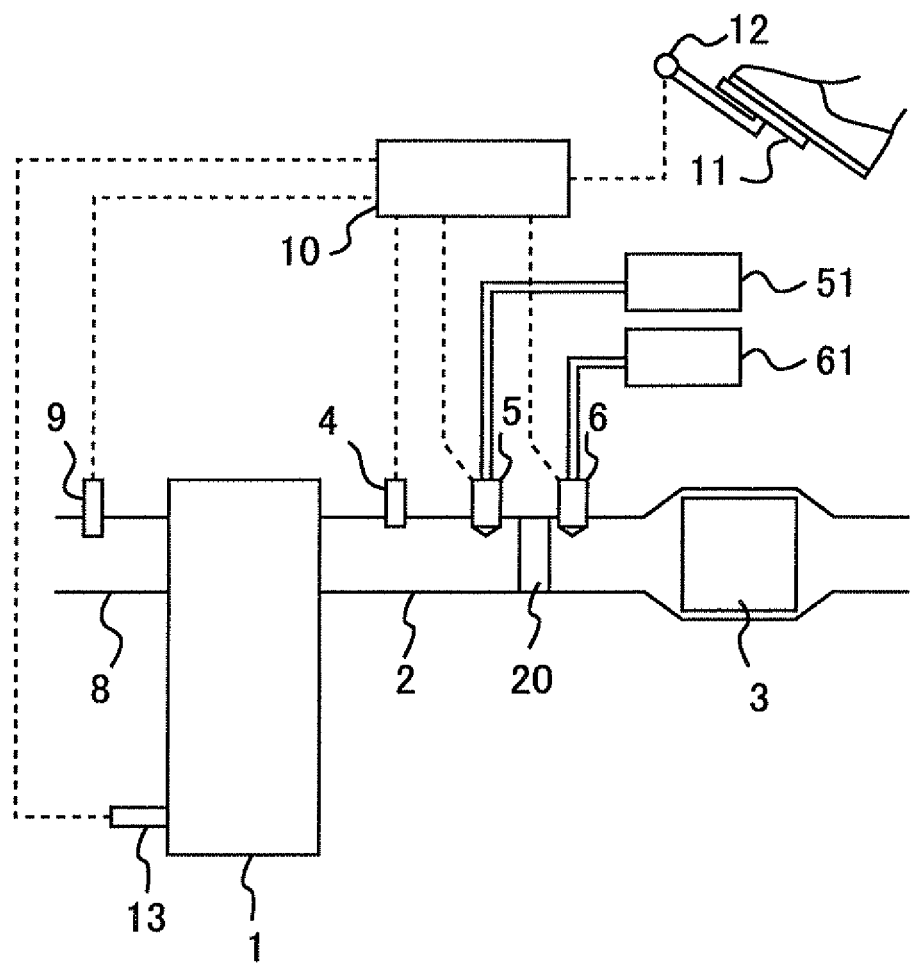
FIG. 9 is another view showing the schematic construction of the exhaust gas purification apparatus of an internal combustion engine according to the first embodiment of the present invention.

FIG. 9 is another view showing the schematic construction of an exhaust gas purification apparatus of an internal combustion engine according to this first embodiment of the present invention. What is different from FIG. 1 will be explained below. In the exhaust gas purification apparatus of an internal combustion engine shown in FIG. 9, at the downstream side of the liquid injection valve 5 and at the upstream side of the gas injection valve 6, there is provided a dispersion device 20 for causing an additive to be dispersed in a wider range. This dispersion device 20 may be arranged at the upstream side of the liquid injection valve 5. Also, the dispersion device 20 may be arranged at the downstream of the gas injection valve 6. Moreover, the positions of the liquid injection valve 5 and the gas injection valve 6 may be reversed with respect to each other.

The dispersion device 20 should just be one which serves to increase turbulence of the exhaust gas, or to cause the exhaust gas to swirl. For example, a plate with a plurality of holes formed therethrough to open may be arranged in a vertical manner with respect to the flow of the exhaust gas.

With the provision of the dispersion device 20, the additives disperse in a wider area or range in the exhaust gas, so the additives can be supplied to the catalyst 3 in a uniform manner. In addition, the evaporation of the liquid additive can be facilitated.

As described above, according to this embodiment, based on the operating state of the internal combustion engine 1, etc., the amount of the liquid additive and the amount of the gas additive can be adjusted. That is, the amount of the liquid additive and the amount of the gas additive can be adjusted according to a rule which has been defined beforehand. As a result of this, the purification rate of the exhaust gas in the catalyst 3 can be enhanced, or the amounts of the additives to be supplied can be decreased. In addition, in a state where the gas additive is apt to pass through the catalyst 3, such as at the time of transient operation of the engine, the liquid additive is supplied, and hence it is possible to suppress the additive from passing through the catalyst 3. Also, due to the provision of the gas tank 61, it is not necessary to cause a liquid or solid additive to evaporate by heating it with the use of a heater, etc., as a result of which the amount of consumption of energy can be reduced. According to these measures, it is possible to supply the additives to the catalyst 3 in an efficient manner.

Second Embodiment

Figure 10:
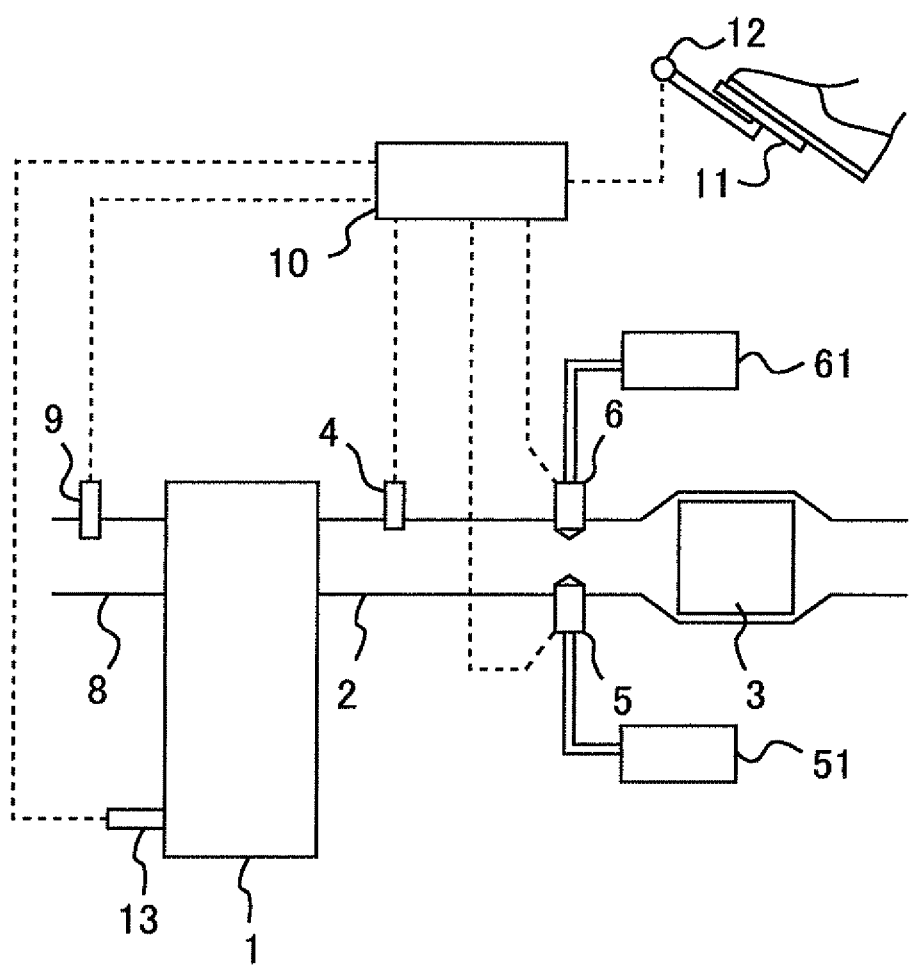
FIG. 10 is a view showing the schematic construction of an exhaust gas purification apparatus of an internal combustion engine according to a second embodiment of the present invention.

FIG. 10 is a view showing the schematic construction of an exhaust gas purification apparatus of an internal combustion engine according to this second embodiment of the present invention. What is different from FIG. 1 will be explained below. In the exhaust gas purification apparatus of an internal combustion engine shown in FIG. 10, the liquid injection valve 5 and the gas injection valve 6 are arranged in opposition to each other. According to such an arrangement, the liquid additive injected from the liquid injection valve 5 and the gas additive injected from the gas injection valve 6 collide with each other in the exhaust passage 2. With this, both of the additives are dispersed in a wider area or range in an exhaust gas, so the additives can be supplied to the catalyst 3 in a uniform manner. Here, note that both of the additives only need to collide with each other, so the liquid injection valve 5 and the gas injection valve 6 may shift from their opposing positions to some extent.

Figure 11:
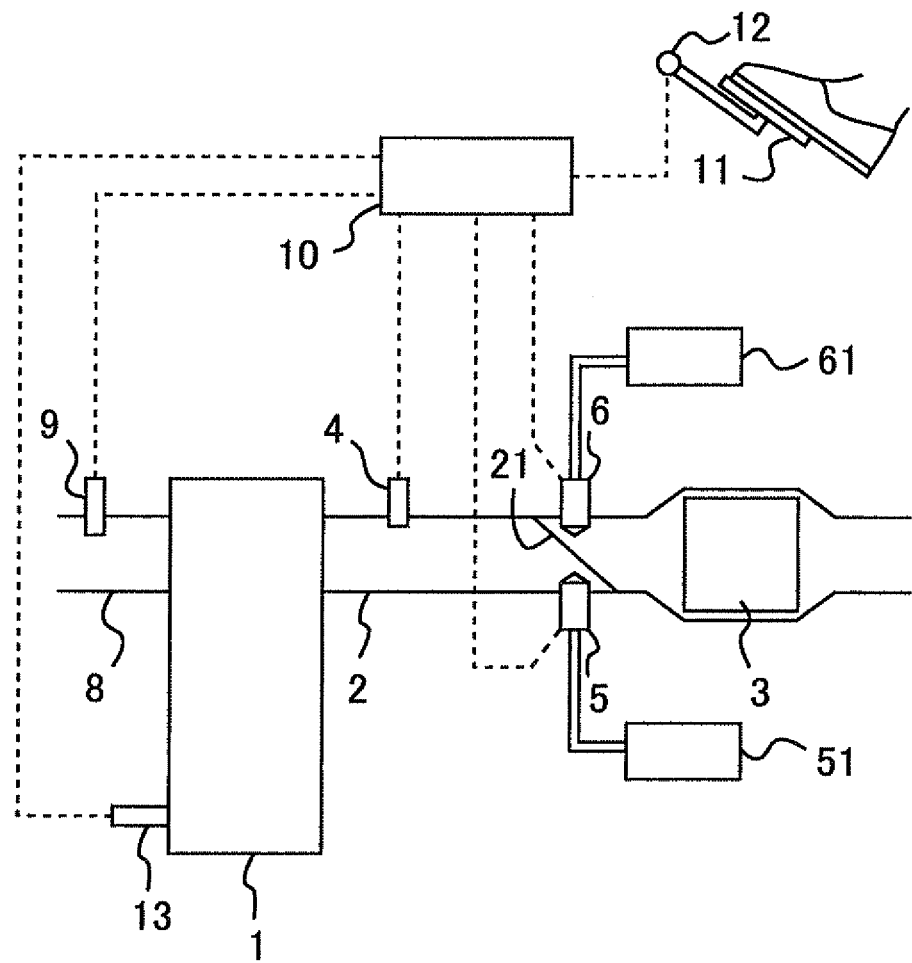
FIG. 11 is another view showing the schematic construction of the exhaust gas purification apparatus of an internal combustion engine according to the second embodiment of the present invention.
Figure 12:
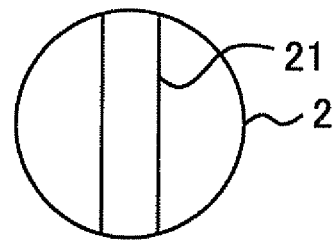
FIG. 12 is a view looking at a dispersion plate from an upstream side of an exhaust passage.

Next, FIG. 11 is another view showing the schematic construction of the exhaust gas purification apparatus of an internal combustion engine according to this second embodiment of the present invention. What is different from FIG. 10 will be explained below. In the exhaust gas purification apparatus of an internal combustion engine shown in FIG. 11, a dispersion plate 21 for causing disturbance or turbulence in the flow of the exhaust gas is provided in the exhaust passage 2 between the liquid injection valve 5 and the gas injection valve 6. This dispersion plate 21 causes an additive to disperse into a wide area or range in the exhaust gas. Here, FIG. 12 is a view looking at the dispersion plate 21 from an upstream side of the exhaust passage 2.

The dispersion plate 21 is a substantially rectangular plate made of metal which has a surface inclined with respect to the direction of flow of the exhaust gas, i.e., with respect to the direction of the central axis of the exhaust passage 2. When viewed from the upstream of the exhaust passage 2, the area of the dispersion plate 21 is smaller than the passage area of the exhaust passage 2. The length of the dispersion plate 21 is longer than the diameter of the exhaust passage 2, and the width thereof is shorter than the diameter of the exhaust passage 2. Then, the lengthwise or longitudinal direction of the dispersion plate 21 is inclined with respect to the direction of flow of the exhaust gas, and the widthwise or cross direction of the dispersion plate 21 is orthogonal to the direction of flow of the exhaust gas. The dispersion plate 21 has a center thereof located on the central axis of the exhaust passage 2, and has an upstream end and a downstream end thereof welded to the wall surface of the exhaust passage 2, respectively. Here, because the width of the dispersion plate 21 is shorter than the diameter of the exhaust passage 2, the exhaust gas can flow through between the dispersion plate 21 and the wall surface of the exhaust passage 2.

Then, the liquid injection valve 5 is mounted at a surface side of the dispersion plate 21 which is directed to the upstream side. Also, the gas injection valve 6 is mounted at a surface side of the dispersion plate 21 which is directed to the downstream side. Here, note that the positions of the liquid injection valve 5 and the gas injection valve 6 may be reversed with respect to each other. In addition, the dispersion plate 21 may be a planar plate, or it may be a corrugated plate, etc. The dispersion plate 21 may have a plurality of holes formed therethrough to open, or it may have a catalyst carried or supported thereon.

When the dispersion plate 21 is arranged in this manner, the exhaust gas flows through the sides of the dispersion plate 21. Then, the exhaust gas before passing through the sides of the dispersion plate 21 flows through the surroundings of the liquid injection valve 5, and the exhaust gas after passing through the sides of the dispersion plate 21 flows through the surroundings of the gas injection valve 6.

Here, by arranging the dispersion plate 21 in the flow of the exhaust gas, turbulence arises in the flow of the exhaust gas, so the additives disperse in a wide area therein. Here, note that the dispersion of the additives may be made by causing the additives to collide with the dispersion plate 21. And, in this embodiment, the dispersion plate 21 corresponds to "a plate that causes collision of additives" in the present invention.

Here, note that when HC is supplied from the liquid injection valve 5 and ammonia gas is supplied from the gas injection valve 6, both of the additives will collide with each other to be mixed, whereby amine compounds will be generated. Because the amine compounds have high reactivity in the catalyst 3, it is possible to enhance the purification rate of NOx to a further extent.

Thus, according to this embodiment, the liquid injection valve 5 and the gas injection valve 6 are arranged in opposition to each other, so both of the additives collide with each other, whereby the additives can be made to disperse to a more extent. In addition, the additive supplied from the liquid injection valve 5 and the additive supplied from the gas injection valve 6 are caused to disperse into a wider area in the exhaust gas by means of the dispersion plate 21, so the additives can be supplied to the catalyst 3 in a uniform manner. Moreover, the liquid injection valve 5, the gas injection valve 6, and the dispersion plate 21 can be arranged in a narrow range of the exhaust passage 2.

Third Embodiment

In this third embodiment, it is assumed that the catalyst 3 is supported by a filter. The other devices, parts and so on are the same as those in the first embodiment, so the explanation thereof is omitted. In addition, in this embodiment, an additive is added only from the gas injection valve 6 at the time of regeneration of the filter. By causing this additive to react in the catalyst 3, the temperature of the filter is raised. When doing so, the PM (particulate matter) collected in the filter is oxidized by the oxygen contained in the exhaust gas. If the liquid additive is added at the time of regeneration of the filter, there will be a fear that the liquid additive may be solidified by adhering to the wall surface of the exhaust passage 2 and the catalyst 3. For this reason, in this embodiment, at the time of regeneration of the filter, only the gas additive is added. Here, note that at the time of regeneration of the filter, the proportion of the gas additive may be made higher than at the other times, and the proportion of the liquid additive may be made lower than at the other times.

Figure 13:
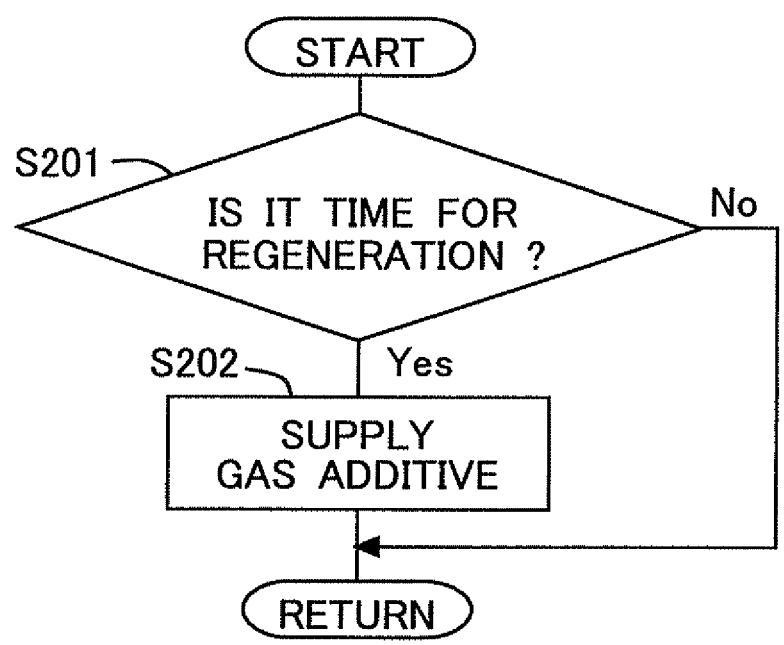
FIG. 13 is a flow chart showing a control flow according to a third embodiment of the present invention.

FIG. 13 is a flow chart showing a control flow or routine according to this third embodiment. This routine is carried out by means of the ECU 10 at each predetermined time interval.

In step S201, it is determined whether it is the time for the filter to be regenerated. For example, the amount of the emission of PM, which is estimated from the operating state of the internal combustion engine 1, is accumulated or integrated, and when the integral value thus obtained reaches a threshold value, the regeneration of the filter is carried out. In cases where an affirmative determination is made in step S201, the routine advances to step S202. On the other hand, in cases where a negative determination is made, this routine is terminated, and the additives are added according to the operating state of the engine at that time, etc.

In step S202, the filter is regenerated by adding an additive only from the gas injection valve 6. The amount of addition of the additive at this time may be controlled in a feedback manner, so that the temperature of the filter becomes an optimal temperature for the regeneration of the filter, for example.

In addition, only the gas additive may be added at the time when the additives adsorbed to the catalyst 3 are removed, too. In this case, the filter need not be provided. For example, in cases where the catalyst 3 is a selective reduction type NOx catalyst, the catalyst 3 has been made to adsorb ammonia beforehand. Then, by supplying an additive at the time when the amount of ammonia adsorbed to the catalyst 3 becomes less than a prescribed amount, the amount of ammonia adsorbed to the catalyst 3 is maintained at the prescribed amount. Here, although the amount of ammonia adsorbed to the catalyst 3 is estimated by the ECU 10, the purification of NOx becomes difficult, for example, in cases where a part of the ammonia adsorbed to the catalyst 3 has been solidified. In this case, even if the amount of ammonia adsorbed to the catalyst 3 is estimated to be more than the prescribed amount, the purification rate of NOx will become low.

Accordingly, ammonia compounds that are adsorbed to the catalyst 3 are all removed by raising the temperature of the catalyst 3 at a predetermined time. At this time, if the liquid additive is added, there will be a fear that the liquid additive may be solidified by adhering to the wall surface of the exhaust passage 2 and the catalyst 3. For this reason, in this embodiment, only the gas additive is added at the time when the additives adsorbed to the catalyst 3 are removed. In this case, in the above-mentioned step S201, it is determined whether it is the time to raise the temperature of the catalyst 3. For example, when a prescribed time has elapsed, it is determined that it is the time to raise the temperature of the catalyst 3. Here, note that at the time of removing the additives adsorbed to the catalyst 3, the proportion of the gas additive may be made higher than at the other times, and the proportion of the liquid additive may be made lower than at the other times.

As described above, according to this embodiment, when the filter is regenerated, or when the additives adsorbed to the catalyst 3 are removed, only the gas additive is added or the proportion of the gas additive is made higher, so it is possible to suppress the liquid additive from adhering to the catalyst 3 and being solidified. As a result of this, the amounts of additives to be supplied can be decreased, so the additives can be supplied to the catalyst 3 in an efficient manner.

EXPLANATION OF REFERENCE NUMERALS AND CHARACTERS

1 Internal combustion engine
2 Exhaust passage
3 Catalyst
4 Sensor
5 Liquid injection valve
6 Gas injection valve
8 Intake passage
9 Air flow meter
10 ECU
11 Accelerator pedal
12 Accelerator opening sensor
13 Crank position sensor
20 Dispersion device
21 Dispersion plate
51 Liquid tank
61 Gas tank

The invention claimed is:

1. An exhaust gas purification apparatus of an internal combustion engine comprising:
a liquid supply device that stores a liquid additive and supplies the liquid additive into an exhaust passage of the internal combustion engine,
a gas supply device that stores a gas additive and supplies the gas additive into said exhaust passage,
a catalyst that is arranged in the exhaust passage at a downstream side of locations at which the additives are supplied from said liquid supply device and said gas supply device, with the additives reacting in the catalyst, and
an adjustment device that adjusts an amount of the liquid additive to be added from said liquid supply device, and an amount of the gas additive to be added by said gas supply device in accordance with a rule which has been defined beforehand;
wherein said catalyst is arranged at an upstream side of, or is supported by, a filter which collects particulate matter in the exhaust gas; and
wherein said adjustment device makes the proportion of the liquid additive to be added from said liquid supply device lower and the proportion of the gas additive to be added by said gas supply device higher, when regeneration of said filter is carried out than when regeneration of said filter is not carried out.

2. An exhaust gas purification apparatus of an internal combustion engine comprising:
a liquid supply device that stores a liquid additive and supplies the liquid additive into an exhaust passage of the internal combustion engine,
a gas supply device that stores a gas additive and supplies the gas additive into said exhaust passage,
a catalyst that is arranged in the exhaust passage at a downstream side of locations at which the additives are supplied from said liquid supply device and said gas supply device, with the additives reacting in the catalyst, and
an adjustment device that adjusts an amount of the liquid additive to be added from said liquid supply device, and an amount of the gas additive to be added by said gas supply device in accordance with a rule which has been defined beforehand;
wherein said adjustment device makes the proportion of the liquid additive to be added from said liquid supply device lower and the proportion of the gas additive to be added by said gas supply device higher, when the additives are added so as to raise the temperature of said catalyst to a temperature at which the additives adsorbed to said catalyst are removed than when the temperature of said catalyst is not raised to the temperature at which the additives adsorbed to said catalyst are removed.

3. An exhaust gas purification apparatus of an internal combustion engine comprising:
a liquid supply device that stores a liquid additive and supplies the liquid additive into an exhaust passage of the internal combustion engine,
a gas supply device that stores a as additive and supplies the gas additive into said exhaust passage,
a catalyst that is arranged in the exhaust passage at a downstream side of locations at which the additives are supplied from said liquid supply device and said gas supply device, with the additives reacting in the catalyst,
an adjustment device that adjusts an amount of the liquid additive to be added from said liquid supply device, and an amount of the gas additive to be added by said gas supply device in accordance with a rule which has been defined beforehand, and
a detection device that detects a physical quantity which has a correlation with an amount of the gas additive passing through said catalyst;
wherein said adjustment device adjusts the amount of the liquid additive to be added from said liquid supply device and the amount of the gas additive to be added by said gas supply device, based on the physical quantity detected by said detection device; and
wherein said adjustment device makes the proportion of the liquid additive to be added from said liquid supply device higher and the proportion of the gas additive to be added by said gas supply device lower, in accordance with regions where the amount of the gas additive passing through said catalyst, represented by said physical quantity, becomes larger.

4. The exhaust gas purification apparatus of an internal combustion engine as set forth in claim 3, wherein
said detection device detects acceleration of the internal combustion engine; and
said adjustment device makes the proportion of the liquid additive to be added from said liquid supply device higher and the proportion of the gas additive to be added by said gas supply device lower, at the time of acceleration of the internal combustion engine than at the time of steady operation thereof.

5. The exhaust gas purification apparatus of an internal combustion engine as set forth in claim 4, wherein the amount of liquid additive to be supplied per one time when supplying the liquid additive is made larger, and the interval at which the liquid additive is supplied is made longer, at the time of acceleration of said internal combustion engine than at the time of steady operation thereof.

6. The exhaust gas purification apparatus of an internal combustion engine as set forth in claim 3, wherein said gas supply device is constructed to comprise a gas injection valve that injects the gas additive into the exhaust gas, and said liquid supply device is constructed to comprise a liquid injection valve that injects the liquid additive into the exhaust gas, and said gas injection valve and said liquid injection valve are arranged in opposition to each other.

7. The exhaust gas purification apparatus of an internal combustion engine as set forth in claim 6, wherein a plate for causing the additives to collide with each other is arranged between said gas injection valve and said liquid injection valve.

8. The exhaust gas purification apparatus of an internal combustion engine as set forth in claim 6, wherein an ammonia gas is injected from said gas injection valve, and HC is injected from said liquid injection valve.

* * * * *